F. NITSCHELM.
SHUTTLE CHECK FOR LOOMS.
APPLICATION FILED JULY 15, 1910.
996,508.
Patented June 27, 1911.
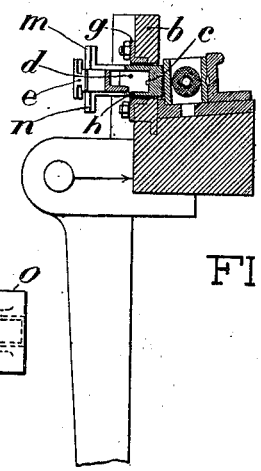
FIG. 1.
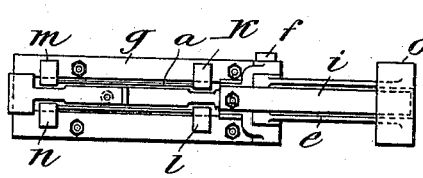
FIG. 4.
FIG. 3.
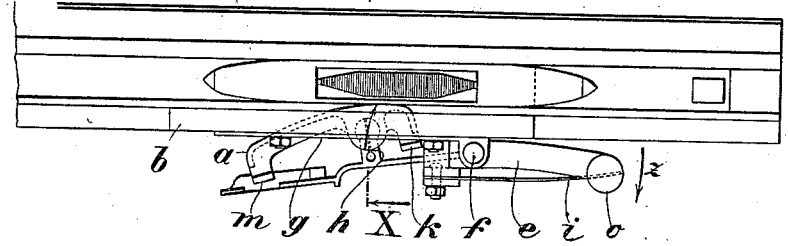
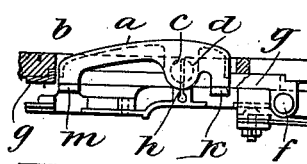
FIG. 7.   FIG. 5.
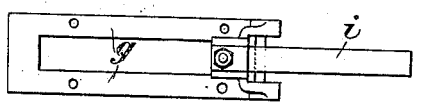
FIG. 6.
FIG. 2.
FIG. 8.
FIG. 10.   FIG. 9.
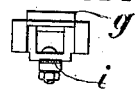
WITNESSES:
René Bruine
William F. Martinez
INVENTOR:
Fritz Nitschelm,
By Attorneys
Fraser Gurk & Myers
THE NORRIS PETERS CO., WASHINGTON, D. C.

UNITED STATES PATENT OFFICE.

FRITZ NITSCHELM, OF AUDINCOURT, FRANCE.

SHUTTLE-CHECK FOR LOOMS.

996,508.            Specification of Letters Patent.      Patented June 27, 1911.

Original application filed June 20, 1910, Serial No. 567,767. Divided and this application filed July 15, 1910. Serial No. 572,151.

*To all whom it may concern:*

Be it known that I, FRITZ NITSCHELM, a subject of the Emperor of Germany, and resident of Audincourt, Doubs, France, have invented new and useful Improvements in Shuttle-Checks for Looms, of which the following is a full, clear, and exact specification.

It is well known to provide the shuttle boxes of looms with brake tongues or checks, which are arranged to brake and receive the shuttle, as the latter enters into the shuttle box. The arrangements of these brake tongues or checks used up to the present are too well known to necessitate description here.

The subject of the present invention is a brake tongue or check arrangement for the shuttle boxes of looms, which is advantageously distinguished from the usual arrangement by the fact that a brake tongue pivoted to an arm of a spring actuated lever is controlled in such a manner by a counterpoise on the other arm of the lever, by virtue of the kinetic energy stored in the weight in the previous movement of the lay, that the shuttle when it enters the box is powerfully braked or checked by the united force of the spring and the kinetic energy of the counterpoise.

The accompanying drawings show this improved brake tongue or check arrangement.

Figure 1 is a front view and Fig. 2 is a plan view of the same. Fig. 3 shows the same in plan view on an end portion of a lay in a position of the parts corresponding to the entering and braking of the shuttle. Fig. 4 is a transverse section on the line X—X in Fig. 3, Figs. 5, 6 and 7 show separately in front, plan and end view, respectively, the tongue carrying lever. Figs. 8, 9 and 10 show in three different views the mode of fastening of the lever spring to a shuttle-box front plate.

The part of the brake tongue *a* which is within the shuttle box *b* is formed with a curved engaging surface, which facilitates the entry of the shuttle and which slopes off about the middle of the tongue to a straight flat brake surface. It is connected by means of a ball socket *c* to a head *d* (Figs. 2 and 4) on one arm of a two-armed lever *e* which is movably pivoted at *f* to the slotted shuttle box front plate *g*. This lever *e* is separately represented in Figs. 5, 6 and 7. A groove *h* in the head *d* allows the ball joint between the said lever and the brake tongue to be lubricated. On the arm opposite to the brake tongue, the lever *e* is provided with a suitable counterpoise *o* of sufficient heaviness to greatly contribute to the braking action, owing to the kinetic energy stored therein in the previous movement of the lay and coming into operation upon the tongue carrying lever *e* when the shuttle enters the box at the rear end of the lay stroke, as will be stated below. Further, the lever *e* is under the control of a leaf spring *i* which is fastened on the box plate *g* (Figs. 8, 9 and 10) and which acts yieldingly on the counterpoise arm of the lever in such a manner that it causes the brake tongue *a* to penetrate into the shuttle box; the inner position of the brake tongue *a* is fixed by lugs *k*, *l*, *m*, *n*, carried by said tongue and which bear against the plate *g*.

As the brake tongue *a* is pivoted at a point about two thirds of its length, toward the outer end of the shuttle box, then the shuttle will, on entering the shuttle box cause the tongue to swing slightly about its pivot, whereby the brake tongue under these conditions rests with the lugs *k*, *l* against the plate *g*. According as the shuttle seeks to penetrate farther into the shuttle box, the brake tongue *a* must swing back about its pivot and thereby the lever *e* is turned back. This is the position of the parts shown in Fig. 3, where the shuttle has just entered the shuttle box at the rear end of the lay stroke. Then not only is the tensioned spring *i* opposed to this movement, but also the kinetic energy stored in the counterpoise *o* in the previous movement of the lay, which in the position of parts shown in Fig. 3, acts on the counterpoise *o* in the direction of the arrow *z*, in such a manner that in addition to the tensioned spring *i* it causes the brake tongue to act with great force on the entering shuttle so that the latter is strongly braked by this combined force and thus softly stopped.

What I claim is:

1. In brake tongue or check arrangements for loom shuttles, the combination with the brake tongue, of a two-armed spring controlled lever, connecting means between said brake tongue and one arm of said lever, and a counterpoise carried by the other arm of said lever for the purpose of increasing the braking action of the brake tongue by virtue of its kinetic energy, substantially as set forth.

2. In brake tongue or check arrangements for loom shuttles, the combination with the brake tongue, of a two-armed spring controlled lever, movable connecting means between said brake tongue and one arm of said lever, and a counterpoise carried by the other arm of said lever for the purpose of increasing the braking action of the brake tongue by virtue of its kinetic energy, substantially as set forth.

3. In brake tongue or check arrangements for loom shuttles, the combination with the brake tongue, of a two armed spring controlled lever one arm of which engages said brake tongue, and a counterpoise adapted to operate upon the other arm of said lever for the purpose of increasing the braking action of the brake tongue by virtue of its kinetic energy, substantially as set forth.

In witness whereof I have hereunto signed my name this 18th day of June 1910, in the presence of two subscribing witnesses.

FRITZ NITSCHELM.

Witnesses:
GEORGE GIFFORD,
AMAND BRAUN.

Copies of this patent may be obtained for five cents each, by addressing the "Commissioner of Patents, Washington, D. C."